Aug. 20, 1929.　　　　O. S. PENN　　　　1,724,961
ENDLESS TRACK FOR VEHICLES
Filed Nov. 27, 1926　　2 Sheets-Sheet 1

INVENTOR:
OSCAR STYLES PENN,
By his Attorneys,

Aug. 20, 1929.     O. S. PENN     1,724,961
ENDLESS TRACK FOR VEHICLES
Filed Nov. 27, 1926     2 Sheets-Sheet 2
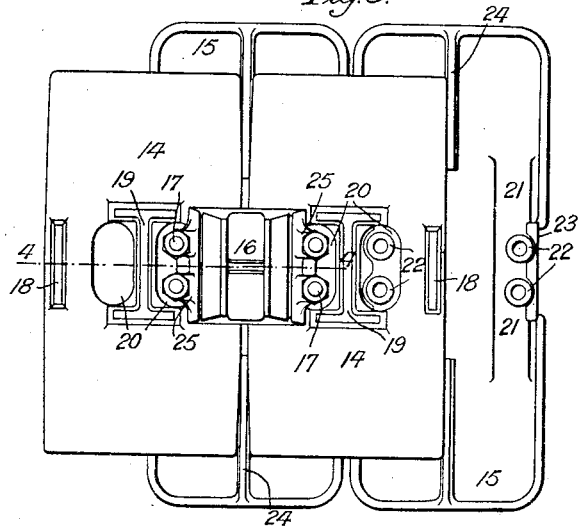
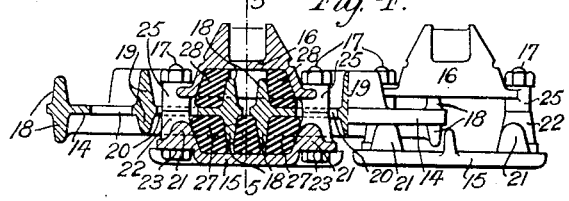
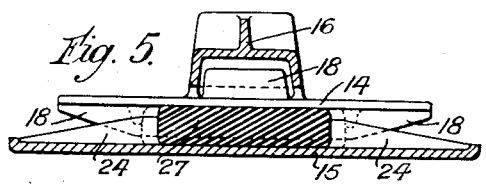
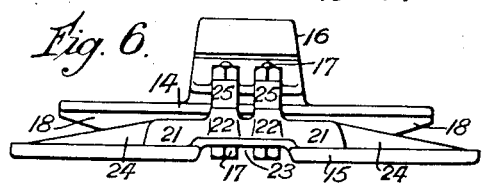
INVENTOR:
OSCAR STYLES PENN,
By his Attorneys, Patented Aug. 20, 1929.

1,724,961

UNITED STATES PATENT OFFICE.

OSCAR STYLES PENN, OF SUNBURY ON THAMES, ENGLAND, ASSIGNOR TO ROADLESS TRACTION, LIMITED, OF HOUNSLOW, MIDDLESEX, ENGLAND.

ENDLESS TRACK FOR VEHICLES.

Application filed November 27, 1926, Serial No. 151,080, and in Great Britain January 18, 1926.

This invention relates to improvements in joints in which a number of separate links are connected to one another to form a chain member, and is especially adapted for endless tracks for vehicles.

The object of this invention is to dispense with the pin or other metallic form of joint by which the links forming the chain member are connected together.

According to this invention the joints of a chain member comprising a number of separate links are so formed that the working of the joints depends upon the flexure of rubber or other resilient material which takes up the movement between the adjacent links, whereby the pin or other metallic form of joint is dispensed with. Preferably the ends of the links are constructed to mate with one another and engage one or more blocks of rubber or other resilient material which are preferably inserted in the joint so as to be under compression.

By means of this invention we are enabled (1) to transfer the vertical loading on the track from the links to the shoes, and to distribute evenly the loading over the surface of the shoes in contact with the ground; (2) to control the point about which the links turn relatively to each other, and (3) to facilitate the assembly of the parts of the track.

The substitution of a resilient block in compression for a pin or other metallic form of joint is applicable to all types of endless tracks whether laterally flexible or not.

Figure 1:
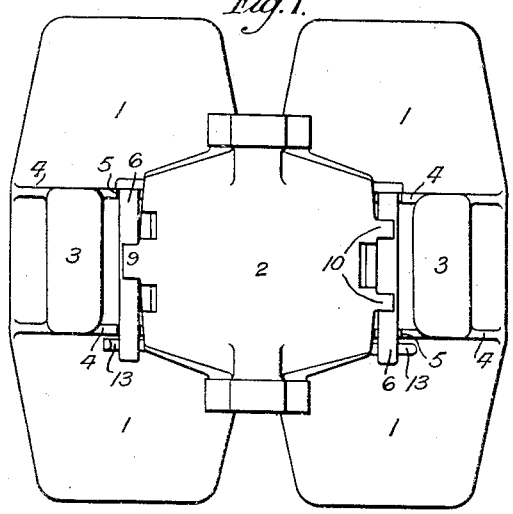
Figure 2:
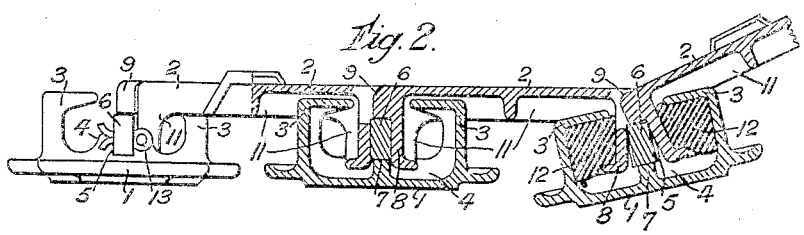

The invention is illustrated in the accompanying drawings in which Figure 1 is a plan and Figure 2 a central longitudinal section of a track, the rubber blocks only being shown in the right hand shoe member. Figures 3, 4, 5, 6 show a modification, Figure 3 being a plan and Figure 4 a section on the line 4—4 of Figure 3, and Figures 5 and 6 are respectively a transverse section on the line 5—5 of Figure 4 and right hand end elevation of Figure 4.

Referring to Figures 1 and 2, the track comprises shoe members 1 and link members proper 2. The shoe members 1 have turned-over ends 3 of inverted L section, the bases of the L's forming the top of the shoe and between which a gap is left for the insertion of the link members. The sides of the shoe members are partly enclosed by a web portion 4, slotted at 5 to carry a removable stem or locking piece 6 adapted when in position to rest on a transverse portion 7 of the web 4 (see Figure 2). The link members are similarly shaped and have turned-over L shaped ends 8 on the outside of which are formed male shoulders 9 at one end and female shoulders 10 at the other; web portions 11 partly enclose the sides. 12 are rubber blocks.

To assemble the track the rubber blocks are placed on either side of the transverse portions 7 when the link members are positioned so that the toes of their L shaped ends are underneath the rubber blocks. The stems or locking pieces 6 are then forced between the adjoining faces of each link member and secured in position by a split pin 13.

In the modification shown in Figures 3, 4, 5 and 6, 14 are link members and 15 and 16 the lower and upper parts respectively of the shoe members adapted to be bolted together by bolts 17 when in position.

The link members 14 are formed with upwardly and downwardly projecting flanges 18 at their outer ends so as to form substantially T shaped ends, and are also provided with similar flanges 19 arranged centrally, the upper part of which in plan is of I shape.

On either side of the flanges 19 are slots 20 in which the joining faces of the upper and lower portions of the shoe member meet, and are secured by the bolts 17. The lower part 15 forming the shoe proper of the track consists of a dished plate provided with centrally arranged upstanding shoulders 21 at either end formed with bosses 22, in which are bolt holes. The edge of the plate is slightly sunk at 23 to take the heads of the bolts. Extending inwardly from the sides of the plate are short flanges 24.

The upper part 16 of the shoe member is in the form of a cap, the walls of which house the upper half of the joint, the end walls being formed with bosses 25 in which are holes for carrying the bolts 17. The top of the cap is shaped with sloping ends 26 and constitutes the driving elements.

Three rubber blocks 27 constitute the lower portion, and two blocks 28 the upper portion of the joint.

To assemble the track two links are placed with their T ends adjoining and engaging the gaps between the three rubber blocks previously positioned in the lower part of the shoe member. The remaining two blocks are then placed in position and the upper part of the shoe member bolted down.

In practice the compression of the rubber blocks is so adjusted that the tracks shown in Figures 3, 4, 5 and 6 sets with a slight angle to the horizontal between adjacent members.

It will be seen that an endless track or like flexible member constructed in accordance with this invention has in addition to the normal bending movement, a lateral or sideways flexibility.

What I claim is:—

1. An endless track member comprising a number of separate links consisting of shoe members and link members proper, the shoe members being formed of detachably secured upper and lower portions, and blocks of resilient material positioned in the shoe members and engaging the ends of the link members to take up the relative movement between said shoe and link members.

2. An endless track member comprising a number of separate links consisting of shoe members and link members proper, the shoe members being formed of detachably secured upper and lower portions mating with the link members and housing blocks of resilient material positioned to take up the relative movement between the shoe members and link members proper.

3. An endless track member comprising a number of separate links consisting of shoe members and link members proper, the shoe members being formed of detachably secured upper and lower portions and the link members with T shaped ends, the blocks of resilient material positioned in the shoe members and engaging the T shaped ends of the link members to take up the relative movement between said shoe and link members.

4. An endless track member comprising a number of separate links consisting of shoe members and link members proper, the shoe members being formed of detachably secured upper and lower portions and the link members with T shaped ends which are housed in the shoe members, blocks of resilient material being positioned between the T shaped ends of the link members and the confining walls of the shoe members to take up the relative movement between said shoe and link members.

5. In an endless articulated member, the combination with a series of shoe members, of a series of links associated with said members, and blocks of resilient material housed in the members and which directly hold the links out of metallic contact with the members and operatively connect them for pivotal movement.

6. A chain comprising a series of links and a series of connecting members for the links spacing the links apart, and resilient blocks interposed between the links and the connecting members and held by said members in close contact with the links.

7. An endless track member comprising a series of links and a series of shoes associated with the links, and resilient blocks interposed between the links and the shoes and held by the shoes in contact with the links.

8. A traction member comprising a series of links and a series of shoes associated with the links and resilient blocks interposed between the links and the shoes which hold the links out of contact with each other, but operatively connect the links with the shoes.

9. A traction member comprising a series of links placed end to end, a series of traction shoes associated with the links, and blocks of resilient material interposed between the links and the shoes and held in place by portions of the links and shoes.

10. A traction member comprising a series of links, a series of traction shoes associated with the links and which are movable relative to the links, and blocks of resilient material interposed between the shoes and the links which hold the shoes out of metallic contact with the links and operatively connect them for pivotal movement.

11. The combination with a series of links, of a series of shoes associated with the links, and blocks of resilient material carried by the shoes and overlapped by and engaging portions of the links whereby the links are held out of metallic contact with the shoes and the links and the shoes are operatively connected for pivotal movement.

12. The combination with a series of links, of a series of hollow shoes associated with the links and which house portions of the links and blocks of resilient material under compression carried by the shoes and which engage those portions of the links which are housed by the shoes.

13. In a pintle-less joint, separated elements having portions extending partly across each other, and resilient material engaged and retained by said portions, said resilient material constituting the sole hinge connection for the said portions of the elements.

14. A joint comprising a plurality of links, a plurality of separate housing members having abutments, each pair of adjacent links having projections received within a housing member, and blocks of resilient material between said projections and said abutments.

15. In a pintle-less joint, a plurality of links, a connecting member therefor separate therefrom, said member having abutments, said links extending across said abutments and having projections and blocks of resilient material between said projections and said abutments.

16. In a joint, a plurality of links, a connecting member therefor separte therefrom, said member having abutments arranged substantially transversely thereof, said links extending across said abutments and having projections inwardly thereof and substantially parallel to said abutments, and blocks of resilient material between said projections and said abutments.

17. The combination of a pair of link members one of which houses a resilient body, the other link member having a portion engaging the body and spaced thereby from the first link member, whereby the link members are held in articulated relation.

In testimony that I claim the foregoing to be my invention, I have signed my name this 15 day of November 1926.

OSCAR STYLES PENN.